United States Patent

Sueyasu et al.

Patent Number: 5,334,398
Date of Patent: Aug. 2, 1994

[54] PROCESSES FOR THE PRODUCTION OF A CHEESE CURD AND CHEESE CONTAINING WHEY PROTEIN

[75] Inventors: Ryoichi Sueyasu; Kunio Ueda; Kazuhiko Sagara, all of Yamanashi, Japan

[73] Assignee: Snow Brand Milk Products Co., Ltd., Hokkaido, Japan

[21] Appl. No.: 917,919

[22] Filed: Jul. 21, 1992

Related U.S. Application Data

[63] Continuation of Ser. No. 525,917, May 18, 1990, abandoned.

[30] Foreign Application Priority Data

May 22, 1989 [JP] Japan .................. 1-128372

[51] Int. Cl.$^5$ ............................. A23C 9/12
[52] U.S. Cl. ....................... 426/36; 426/38; 426/40; 426/41; 426/582
[58] Field of Search .................. 426/36–43, 426/34, 580, 582, 583

[56] References Cited

U.S. PATENT DOCUMENTS 4,341,801  7/1982  Weissman .................. 426/40
4,518,616  5/1985  Czulak ........................ 426/40

Primary Examiner—Donald E. Czaja
Assistant Examiner—Leslie Wong
Attorney, Agent, or Firm—Burgess, Ryan & Wayne

[57] ABSTRACT

Efficient utilization of a whey protein for the production of cheese, which results from the cheese production as a by-product. The whey is concentrated by an ultrafiltration and added to the concentrated milk. A milk coagulating enzyme and a lactic acid bacteria starter were added to the resultant mixture together with warm or hot water with stirring to instantaneously elevate the temperature of the reaction mixture to coagulate and give the cheese curd.

8 Claims, No Drawings

PROCESSES FOR THE PRODUCTION OF A CHEESE CURD AND CHEESE CONTAINING WHEY PROTEIN

This application is a continuation of application Ser. No. 525,917, filed May 18, 1990 now abandoned.

BACKGROUND OF THE INVENTION

1. Field of the Invention

This invention relates to a process for the production of a cheese curd enriched with a whey protein concentrate (hereinafter abbreviated as WPC) and the production of cheeses prepared therefrom.

2. Description of the Prior Art

Cheeses have been produced from casein isolated from the coagulated milk. Particularly, hard cheeses have been produced by a draining the whey from the cheese curd in order to reduce the moisture content followed by a molding the curd under pressure. During the process, a whey protein is obtained as a by-product. The recovery and utilization of the whey protein have been the subject of.

For example, U.S. Pat. No. 3,535,304 discloses a method of the co-precipitation of casein and whey protein, and utilization of this precipitate. However, the final product obtained by this method has not been used for the production of cheeses and was used only as an additive for the production of breads and biscuits for lack of the characteristic feature of cheeses or such commodities.

Active investigations to fully use the whey protein for the production of cheeses have been tried also to increase the yield of cheeses. For example, Australian Patent No. 477,399 discloses a concentration of whole milk or skimmed milk to about ⅓ volume by an ultrafiltration to prepare a "liquid pro-cheese" and a production of cheeses from the obtained "liquid pro-cheese". Japan Republication of International Patent Publication No. 501,810 (1982) discloses a selective concentration of milk by an ultrafiltration to increase the ionic strength followed by fermentation and dehydration of this concentrate. The obtained concentrate is used for the production of cheeses. However, these methods merely describe the recovery of original whey protein in milk together with casein and could not fully recover the whey protein, Furthermore, the procedures require removal of water and the wash out of the whey protein is inevitable. Therefore, satisfactory recovery of the whey protein remain unsolved.

An economic utilization with a satisfactory recovery of the highly concentrated whey protein without affecting the flavor of the final product, cheeses, has not been attained despite enthusiastic efforts.

SUMMARY OF THE INVENTION

The main purpose of the present invention is to provide a method for the recovery of the whey protein, a by-product of the cheese production, particular in case of hard cheese, with high recovery rate and an efficient utilization of the recovered whey protein for the production of cheeses. Other objects of the invention will become evident by the following descriptions,

DETAILED DESCRIPTION OF THE REFERRED EMBODIMENT

This invention relates to the production of a cheese curd by a process of a concentration of whole milk by an ultrafiltration, cooling the concentrated milk to 10°~20° C., adding a whey protein concentrate obtained by the ultrafiltration, adjusting the pH of the concentrated milk by the addition of an acid before or after the addition of the whey protein concentrate, and stirring of the resultant mixture with the addition of a milk coagulating enzyme and a lactic acid bacteria starter together with hot or warm water to elevate the temperature of the mixture in an instant. The invention further relates to the production of cheeses from the obtained cheese curd.

The concentrated whey protein obtained by the ultrafiltration may be added as it is or at an elevated temperature of approximately 60° C. to the concentrated milk.

The milk used in the present invention can be selected from whole and processed milk of cows and goats. These milks are pasteurized, cooled and ultrafiltered. The preferable concentration factor of the milk is about 4~6-fold (v/v) concentration during the ultrafiltration.

The resultant concentrated milk is cooled to 10°~20° C. and adjusted to pH 4.8~5.8 by the addition of a conventional acid used for food processing such as lactic acid, acetic acid, tartaric acid and citric acid. The cooled and pH adjusted concentrated milk can be coagulated by the treatment with warm or hot water.

Separately, the whey, a by-product of cheese production, is concentrated by an ultrafiltration (herein after the concentrate is abbreviated as WPC). The preferable concentration factor is about 10~20-fold concentration (v/v).

The resultant WPC is added without heat treatment to the concentrated milk for the production of fresh cheeses or soft type cheeses such as Camembert cheese, or is heated to about 60° C. to make a slurry texture prior to the addition to the concentrated milk for the production of semihard cheeses such as Gouda cheese or hard cheeses. Heating of WPC to about 60° C. provides a slurry texture, just prior to the formation of a curd, with an increased viscosity. The increased viscosity prevents the flow out of WPC with the whey, which often accompanies with the mandatory removal of the whey by pressure, in the process for the production of semihard and hard cheeses and improves the recovery rate of solid mass.

Then, the WPC is added to the concentrated milk preferably in amounts of 10°~30% to the concentrated milk and the pH adjustment to 4.8~5.8 may be performed in this step. Additional amounts of WPC at more than 30% may reduce the proportion of the concentrated milk, impair the curd formation, and finally result in the poor recovery rate of WPC. The ratios of addition differs with the rate of concentrated milk, for example, 10~30% is preferable for 4-fold concentration (v/v) and up to 50% may be applied for 6-fold concentration (v/v).

A milk coagulating enzyme and a lactic acid bacteria starter are added to the resultant mixture and then, mixed with warm or hot water with stirring. Thus, the temperature of the mixture is elevated instantaneously to give a good coagulated mass of cheese curd containing whey protein with high yield. The temperature of warm or hot water is preferably 60° C. or higher and the lactic acid bacteria starter may be properly selected according to the type of cheese.

Salt is added to the obtained curd and it is ripened by a conventional method to give a new type of cheese having a slight sweet aftertaste with elastic texture and flavor comparable with those of conventional products made solely from casein protein.

The present invention is further illustrated by the following examples. The percentages used in the examples means weight percent except otherwise stated.

EXAMPLE 1.

One hundred kg of a whole milk, fat content is 3.5%, was pasteurized at 75° C. for 15 seconds, cooled to 55° C. and filtered and concentrated with an ultrafiltration plant (DDS-35 type, 9 m$^2$) to about 4-fold concentration and cooled to 10° C.

Separately, six hundred kg of Gouda cheese whey was concentrated to about 20-fold concentration using a similar ultrafiltration plant to give a WPC containing about 30% of solid mass.

The obtained 30 kg of WPC was added to the above mentioned concentrated milk, adjusted to pH 5.2 with lactic acid, and one percent of a mixed lactic acid bacteria starter containing *Lactobacillus bulgaricus* and *Streptococcus thermophilus* and 0. 00370 of a milk coagulating enzyme, Hannsen's rennet, were added. The temperature of the resultant mixture was elevated in a moment with the addition warm water of 75° C. to form a curd.

The resultant curd was molded in a hoop, salted, inoculated with Penicillium spores and kept at 20° C. and RH 95% for four days and ripened at 10° C. and RH 85% for 30 days to give a white moulded ripened cheese with a pleasant flavor and texture. The recovery rate of WPC obtained by the following equation was 87%.

$$\frac{\text{Total solid weight in the cheese curd obtained by the addition of WPC} - \text{Total solid weight in the cheese curd obtained without the addition of WPC}}{\text{Total weight of solid mass of added WPC}} \times 100$$

The recovery rates in the following examples were obtained by a similar manner.

EXAMPLE 2.

A concentrated milk at about 4-fold concentration and a WPC of about 20-fold concentration were prepared similar to example 1. The obtained WPC was treated at 63° C. for 15 minutes, made to a slurry texture, added to the concentrated milk at a rate of 30%, and the obtained mixture was adjusted to pH 5.6 with an addition of lactic acid. A mixed lactic acid bacteria starter and a rennet were added to the adjusted mixture at rates of two and 0.003%, respectively, similarly to example 1 and mixed with a warm water of about 70° C to form a curd.

The formed curd was molded, pressed, salted and ripened at 10° C. to give a Gouda type cheese with pleasant taste and texture.

The recovery rate of WPC was 82%.

EXAMPLE 3.

A concentrated milk at about 4-fold concentration and a concentrated WPC at about 20-fold concentration were prepared similar to example 1. The obtained WPC was added to the concentrated milk without heat treatment, adjusted to pH 5.0. A mixed lactic acid bacteria starter and a rennet were added to the adjusted mixture similar to example 1 and mixed with a warm water at about 65° C. to form a curd.

The obtained curd was hanged for about eight hours and drainage the whey, and a cream containing 30% of fat and sodium chloride were added at ratios of 20% and 1.5%, respectively, to give a cottage type cheese with pleasant flavor and texture.

The recovery rate of WPC was 87%.

As explained above, the present invention provides a cheese curd highly enriched with the whey protein with a high recovery rate by a simple procedure. Furthermore, a new type of cheese having a slight sweet aftertaste with a texture elasticity and comparable with those of conventional products which were solely made from conventional casein curd can be prepared from the obtained cheese curd.

Particularly, as illustrated in the examples, WPC concentrated to 20-fold concentration can be added to the concentrated milk at a rate of about 30%, and furthermore, the recovery rate of the whey protein reached to 80% or more. The addition and high recovery rate of the whey mean the addition of 600 kg of original un-concentrated whey to 100 kg of the concentrated milk, thus, an economic utilization o f the whey can be achieved.

We claim:

1. A process for the production of cheese curd which comprises the steps of:
   (a) concentrating milk by ultrafiltration end cooling said milk to a temperature of from 10° to 20 ° C.
   (b) adding whey protein concentrate to said milk after completion of said ultrafiltration and cooling, adjusting fie pH to between and 5.0 and 5.6 by the addition of acid, and forming a reaction mixture by adding with stirring to said milk and whey protein concentrate, a milk coagulating enzyme, e lactic acid bacteria starter and water, the water is added at a temperature of from 65° to 75° C., to instantaneously elevate the temperature of said mixture and thereby coagulate the mixture to form the cheese curd and a liquid phase and
   (c) thereafter recovering hid cheese curd from the liquid phase.

2. The process of claim 1 wherein the whey protein concentrate is obtained by ultrafiltration and is added to said milk in step (b) without heat treatment.

3. The process of claim 1 wherein the whey protein concentrate is obtained by ultrafiltration and is heated to approximately 60° C. before adding to said milk in step (b).

4. The process of claim 1 wherein the whey protein concentrate is added to said concentrated milk in an amount of 10–30% by weight based on the weight of said concentrated milk.

5. The process of claim 1 wherein the pH is adjusted in step (b) before the addition of the whey protein concentrate.

6. The process of claim 1 wherein the pH is adjusted in step (b) after the addition of the when protein concentrate.

7. A process for the production of cheese from a cheese curd which comprises the steps of:
   (a) concentrating milk by ultrafiltration and cooling said milk to a temperature of from 10° C. to 12° C.;
   (b) adding whey protein concentrate to said milk end adjusting the pH to between 5.0 and 5.8 by the addition of acid;
   (c) adding a milk coagulating enzyme, a lactic acid bacteria starter and water, with stirring to said milk to form a reaction mixture and wherein the water is at a temperature of from 65° to 75 ° C., to instantaneously elevate the temperature of said mixture and thereby coagulate the mixture to form the cheese curd, and a liquid phase and (d) recovering the cheese curd and allowing said Cheese curd to ripen into cheese.

8. The process of claim 7 wherein the whey protein concentrate is added to said concentrated milk in an amount of 10-30% by weight based on the weight of said concentrated milk.

* * * * *